(12) United States Patent
Scott et al.

(10) Patent No.: US 7,743,223 B2
(45) Date of Patent: Jun. 22, 2010

(54) DECOUPLING OF WRITE ADDRESS FROM ITS ASSOCIATED WRITE DATA IN A STORE TO A SHARED MEMORY IN A MULTIPROCESSOR SYSTEM

(75) Inventors: Steven L. Scott, Eau Claire, WI (US); Gregory J. Faanes, Eau Claire, WI (US)

(73) Assignee: Cray Inc., Seattle, WA (US)

( * ) Notice: Subject to any disclaimer, the term of this patent is extended or adjusted under 35 U.S.C. 154(b) by 964 days.

(21) Appl. No.: 10/643,742

(22) Filed: Aug. 18, 2003

(65) Prior Publication Data

US 2005/0044128 A1 Feb. 24, 2005

(51) Int. Cl.
*G06F 13/00* (2006.01)

(52) U.S. Cl. .................. 711/154; 711/147; 711/159; 711/133; 711/141; 712/6; 709/213

(58) Field of Classification Search .................. 711/117, 711/118, 130, 147, 151, 152, 168, 154, 133, 711/141, 3, 159; 712/2, 3, 4, 7, 6; 709/213
See application file for complete search history.

(56) References Cited

U.S. PATENT DOCUMENTS

| | | | |
|---|---|---|---|
| 4,412,303 A | 10/1983 | Barnes et al. | |
| 4,414,624 A | 11/1983 | Summer, Jr. et al. | |
| 4,868,818 A | 9/1989 | Madan et al. | |
| 4,888,679 A * | 12/1989 | Fossum et al. ........... | 712/6 |
| 4,989,131 A | 1/1991 | Stone | |
| 5,012,409 A | 4/1991 | Fletcher et al. | |
| 5,036,459 A | 7/1991 | den Haan et al. | |
| 5,161,156 A | 11/1992 | Baum et al. | |
| 5,175,733 A | 12/1992 | Nugent | |
| 5,197,130 A | 3/1993 | Chen et al. | |
| 5,218,676 A | 6/1993 | Ben-ayed et al. | |

(Continued)

FOREIGN PATENT DOCUMENTS

EP 0353819 2/1990

(Continued)

OTHER PUBLICATIONS

Jim, Handy,Tthe Cache Memory Book, Academic Press, 1993, pp. 73-84.*

(Continued)

*Primary Examiner*—Hong Kim
(74) *Attorney, Agent, or Firm*—Schwegman, Lundberg & Woessner, P.A.

(57) ABSTRACT

In a computer system having a plurality of processors connected to a shared memory, a system and method of decoupling an address from write data in a store to the shared memory. A write request address is generated for a memory write, wherein the write request address points to a memory location in shared memory. A write request is issued to the shared memory, wherein the write request includes the write request address. The write request address is noted in the shared memory and addresses in subsequent load and store requests are compared in share memory to the write request address. The write data is transferred to the shared memory and matched, within the shared memory, to the write request address. The write data is then stored into the shared memory as a function of the write request address.

35 Claims, 5 Drawing Sheets

U.S. PATENT DOCUMENTS

| | | | |
|---|---|---|---|
| 5,247,635 A | 9/1993 | Kamiya | |
| 5,247,639 A | 9/1993 | Yamahata | |
| 5,247,691 A | 9/1993 | Sakai | |
| 5,276,899 A | 1/1994 | Neches | |
| 5,341,482 A | 8/1994 | Cutler et al. | |
| 5,347,450 A | 9/1994 | Nugent | |
| 5,365,228 A | 11/1994 | Childs et al. | |
| 5,375,223 A * | 12/1994 | Meyers et al. | 711/151 |
| 5,418,916 A | 5/1995 | Hall et al. | |
| 5,430,850 A | 7/1995 | Papadopoulos et al. | |
| 5,430,884 A | 7/1995 | Beard et al. | |
| 5,530,933 A * | 6/1996 | Frink et al. | 711/141 |
| 5,560,029 A | 9/1996 | Papadopoulos et al. | |
| 5,606,696 A | 2/1997 | Ackerman et al. | |
| 5,613,114 A | 3/1997 | Anderson et al. | |
| 5,640,524 A | 6/1997 | Beard et al. | |
| 5,649,141 A | 7/1997 | Yamazaki | |
| 5,684,977 A | 11/1997 | Van Loo et al. | |
| 5,717,895 A | 2/1998 | Leedom et al. | |
| 5,765,009 A | 6/1998 | Ishizaka | |
| 5,781,775 A | 7/1998 | Ueno | |
| 5,787,494 A | 7/1998 | DeLano et al. | |
| 5,796,980 A * | 8/1998 | Bowles | 711/144 |
| 5,812,844 A | 9/1998 | Jones et al. | |
| 5,835,951 A * | 11/1998 | McMahan | 711/145 |
| 5,897,664 A | 4/1999 | Nesheim et al. | |
| 5,978,830 A | 11/1999 | Nakaya et al. | |
| 5,987,571 A * | 11/1999 | Shibata et al. | 711/141 |
| 5,995,752 A | 11/1999 | Chao et al. | |
| 6,003,123 A | 12/1999 | Carter et al. | |
| 6,014,728 A * | 1/2000 | Baror | 711/133 |
| 6,047,323 A | 4/2000 | Krause | |
| 6,088,701 A | 7/2000 | Whaley et al. | |
| 6,101,590 A | 8/2000 | Hansen | |
| 6,161,208 A * | 12/2000 | Dutton et al. | 714/764 |
| 6,247,169 B1 | 6/2001 | DeLong | |
| 6,269,390 B1 | 7/2001 | Boland | |
| 6,269,391 B1 | 7/2001 | Gillespie | |
| 6,317,819 B1 | 11/2001 | Morton | |
| 6,336,168 B1 | 1/2002 | Frederick, Jr. et al. | |
| 6,339,813 B1 * | 1/2002 | Smith et al. | 711/144 |
| 6,356,983 B1 * | 3/2002 | Parks | 711/145 |
| 6,385,715 B1 | 5/2002 | Merchant et al. | |
| 6,389,449 B1 | 5/2002 | Nemirovsky et al. | |
| 6,393,536 B1 | 5/2002 | Hughes et al. | |
| 6,430,649 B1 | 8/2002 | Chaudhry et al. | |
| 6,490,671 B1 | 12/2002 | Frank et al. | |
| 6,496,902 B1 * | 12/2002 | Faanes et al. | 711/118 |
| 6,496,925 B1 | 12/2002 | Kota et al. | |
| 6,519,685 B1 * | 2/2003 | Chang | 711/141 |
| 6,553,486 B1 | 4/2003 | Ansari | |
| 6,591,345 B1 * | 7/2003 | Seznec | 711/127 |
| 6,615,322 B2 | 9/2003 | Arimilli et al. | |
| 6,665,774 B2 | 12/2003 | Faanes et al. | |
| 6,684,305 B1 | 1/2004 | Deneau | |
| 6,782,468 B1 | 8/2004 | Nakazato | |
| 6,922,766 B2 | 7/2005 | Scott | |
| 6,925,547 B2 | 8/2005 | Scott et al. | |
| 6,952,827 B1 | 10/2005 | Alverson et al. | |
| 6,976,155 B2 | 12/2005 | Drysdale et al. | |
| 7,028,143 B2 * | 4/2006 | Barlow et al. | 711/138 |
| 7,089,557 B2 | 8/2006 | Lee | |
| 7,103,631 B1 | 9/2006 | van der Veen | |
| 7,111,296 B2 | 9/2006 | Wolrich et al. | |
| 7,137,117 B2 | 11/2006 | Ginsberg | |
| 7,143,412 B2 | 11/2006 | Koenen | |
| 7,162,713 B2 | 1/2007 | Pennello | |
| 7,191,444 B2 | 3/2007 | Alverson et al. | |
| 7,334,110 B1 | 2/2008 | Faanes et al. | |
| 7,366,873 B1 | 4/2008 | Kohn | |
| 7,421,565 B1 | 9/2008 | Kohn | |
| 7,437,521 B1 | 10/2008 | Scott et al. | |
| 7,519,771 B1 | 4/2009 | Faanes et al. | |
| 2002/0078122 A1 | 6/2002 | Joy et al. | |
| 2002/0091747 A1 | 7/2002 | Rehg et al. | |
| 2002/0116600 A1 | 8/2002 | Smith et al. | |
| 2003/0018875 A1 | 1/2003 | Henry et al. | |
| 2003/0097531 A1 * | 5/2003 | Arimilli et al. | 711/146 |
| 2003/0167383 A1 | 9/2003 | Gupta et al. | |
| 2003/0196035 A1 | 10/2003 | Akkary | |
| 2004/0064816 A1 | 4/2004 | Alverson et al. | |
| 2004/0162949 A1 | 8/2004 | Scott et al. | |
| 2005/0044339 A1 | 2/2005 | Sheets | |
| 2005/0044340 A1 | 2/2005 | Sheets et al. | |
| 2005/0125801 A1 | 6/2005 | King | |
| 2007/0283127 A1 | 12/2007 | Kohn et al. | |

FOREIGN PATENT DOCUMENTS

| | | |
|---|---|---|
| EP | 0353819 A2 | 2/1990 |
| EP | 0475282 | 9/1990 |
| EP | 0473452 A2 | 3/1992 |
| EP | 0475282 A2 | 3/1992 |
| EP | 0501524 A2 | 9/1992 |
| EP | 0570729 A2 | 11/1993 |
| WO | WO-8701750 A1 | 3/1987 |
| WO | WO-8808652 A1 | 11/1988 |
| WO | WO 95/16236 | 6/1995 |
| WO | WO-9516236 A1 | 6/1995 |
| WO | WO-2005020088 A2 | 3/2005 |
| WO | WO-2005020088 A3 | 3/2005 |

OTHER PUBLICATIONS

"U.S. Appl. No. 10/235,898 Non Final Office Action mailed Jul. 7, 2004", 12 pgs.

"U.S. Appl. No. 10/235,898 Notice of Allowance mailed Mar. 15, 2005", 4 pgs.

"U.S. Appl. No. 10/235,898 Response filed Jan. 6, 2005 to Non Final Office Action mailed Jul. 7, 2004", 16 pgs.

"U.S. Appl. No. 10/643,574, Non-Final Office Action Mailed Aug. 7, 2007", 31 pgs.

"U.S. Appl. No. 10/643,574, Advisory Action mailed May 21, 2007", 3 pgs.

"U.S. Appl. No. 10/643,574, Final Office Action mailed Mar. 5, 2007", 31 pgs.

"U.S. Appl. No. 10/643,574, Non-Final Office Action mailed Jan. 30, 2006", 33 pgs.

"U.S. Appl. No. 10/643,574, Non-Final Office Action mailed Jul. 28, 2006", 30 pgs.

"U.S. Appl. No. 10/643,574, RCE and Response Under 37 C.F.R. 1.116 filed Jul. 12, 2007 to Final Office Action mailed Mar. 5, 2007", 19 pgs.

"U.S. Appl. No. 10/643,574, Response filed Nov. 28, 2006 to Non-Final Office Action mailed Jul. 28, 2006", 15 pgs.

"U.S. Appl. No. 10/643,574, Response filed May 1, 2006 to Non-Final Office Action mailed Jan. 30, 2006", 29 pgs.

"U.S. Appl. No. 10/643,574, Response filed May 4, 2007 to Final Office Action mailed Mar. 5, 2007", 15 pgs.

"U.S. Appl. No. 10/643,585, Advisory Action mailed Apr. 2, 2007", 3 pgs.

"U.S. Appl. No. 10/643,585, Advisory Action mailed Aug. 14, 2006", 3 pgs.

"U.S. Appl. No. 10/643,585, Amendment and Response filed Dec. 4, 2006 to Office Action mailed Oct. 23, 2006", 17 pgs.

"U.S. Appl. No. 10/643,585, Amendment and Response filed Mar. 22, 2007 to Final Office Action mailed Jan. 25, 2007", 23 pgs.

"U.S. Appl. No. 10/643,585, Amendment and Response filed Mar. 27, 2006 to Non-Final Office Action mailed Sep. 26, 2005", 7 pgs.

"U.S. Appl. No. 10/643,585, Amendment and Response filed Aug. 3, 2006 to Final Office Action mailed Apr. 14, 2006", 9 pgs.

"U.S. Appl. No. 10/643,585, Final Office Action mailed Jan. 25, 2007", 17 pgs.

"U.S. Appl. No. 10/643,585, Final Office Action mailed Apr. 14, 2006", 13 pgs.

"U.S. Appl. No. 10/643,585, Non-Final Office Action mailed Oct. 23, 2006", 12 pgs.
"U.S. Appl. No. 10/643,585, Non-Final Office Action mailed Sep. 26, 2006", 9 pgs.
"U.S. Appl. No. 10/643,585, Notice of Allowance mailed Jun. 11, 2007", 6 pgs.
"U.S. Appl. No. 10/643,585, RCE and Amendment and Response filed Apr. 23, 2007 to Final Office Action mailed Jan. 25, 2007 and the Advisory Action mailed Apr. 2, 2007", 15 pgs.
"U.S. Appl. No. 10/643,585, Request for Continued Examination filed Sep. 14, 2006", 1 pg.
"U.S. Appl. No. 10/643,585, Response to Rule 312 Communication mailed Jul. 23, 2007", 2 pgs.
"U.S. Appl. No. 10/643,586, Advisory Action mailed Jan. 18, 2007", 3 pgs.
"U.S. Appl. No. 10/643,586, Final Office Action mailed Oct. 19, 2006", 27 pgs.
"U.S. Appl. No. 10/643,586, Non-Final Office Action mailed Feb. 8, 2006", 21 pgs.
"U.S. Appl. No. 10/643,586, Non-Final Office Action mailed May 2, 2007", 36 pgs.
"U.S. Appl. No. 10/643,586, RCE and Amendment and Response filed Feb. 16, 2007 to Final Office Action mailed Oct. 19, 2006 and the Advisory Action mailed Jan. 18, 2007", 19 pgs.
"U.S. Appl. No. 10/643,586, Response filed Jan. 5, 2007 to Final Office Action mailed Oct. 19, 2006", 22 pgs.
"U.S. Appl. No. 10/643,586, Response filed Aug. 1, 2006 to Non-Final Office Action mailed Feb. 8, 2006", 24 pgs.
"U.S. Appl. No. 10/643,586, Response filed Sep. 4, 2007 to Non-Final Office Action mailed Sep. 4, 2007", 18 pgs.
"U.S. Appl. No. 10/643,587, Amendment and Response filed Aug. 13, 2007 to Non-Final Office Action mailed May 8, 2007", 20 pgs.
"U.S. Appl. No. 10/643,587, Non-Final Office Action mailed May 8, 2007", 14 pgs.
"U.S. Appl. No. 10/643,727, Non-Final Office Action mailed Feb. 16, 2006", 33 pgs.
"U.S. Appl. No. 10/643,727, Non-Final Office Action mailed Aug. 11, 2006", 29 pgs.
"U.S. Appl. No. 10/643,727, Notice of Allowance mailed Feb. 28, 2007", 5 pgs.
"U.S. Appl. No. 10/643,727, Notice of Allowance mailed Jul. 19, 2007", 5 pgs.
"U.S. Appl. No. 10/643,727, Response filed Jan. 11, 2007 to Non-Final Office Action mailed Aug. 11, 2006", 15 pgs.
"U.S. Appl. No. 10/643,727, Response filed Jun. 15, 2006 to Non-Final Office Action mailed Feb. 16, 2006", 21 pgs.
"U.S. Appl. No. 10/643,738, Response filed Jan. 16, 2006 non-final office action mailed Sep. 26, 2005", 13 pgs.
"U.S. Appl. No. 10/643,738 Response filed Jul. 19, 2006 non-final office action mailed Feb. 17, 2006", 10 pgs.
"U.S. Appl. No. 10/643,738, Final Office Action mailed Apr. 17, 2007", 12 pgs.
"U.S. Appl. No. 10/643,738, Non-Final Office Action mailed Feb. 17, 2006", 9 pgs.
"U.S. Appl. No. 10/643,738, Non-Final Office Action mailed Sep. 26, 2005", 11 pgs.
"U.S. Appl. No. 10/643,738, Response filed Jul. 17, 2007 final office action mailed Apr. 17, 2007", 17 PGS.
"U.S. Appl. No. 10/643,741 Final Office Action mailed Sep. 11, 2007", 27 pgs.
"U.S. Appl. No. 10/643,741, Non-Final Office Action mailed Apr. 5, 2007", 19 pgs.
"U.S. Appl. No. 10/643,741, Response filed Jun. 4, 2007 to Non-Final Office Action mailed Apr. 5, 2007", 16 pgs.
"U.S. Appl. No. 10/643,754, Advisory Action mailed Nov. 22, 2006", 3 pgs.
"U.S. Appl. No. 10/643,754, Final Office action mailed Sep. 14, 2006", 21 pgs.
"U.S. Appl. No. 10/643,754, Non-Final Office Action mailed Feb. 8, 2006", 16 pgs.
"U.S. Appl. No. 10/643,754, Non-Final Office Action mailed Jul. 5, 2007", 23 pgs.
"U.S. Appl. No. 10/643,754, Response filed Nov. 7, 2006 to Final Office Action mailed Sep. 14, 2006", 12 pgs.
"U.S. Appl. No. 10/643,754, Response filed Mar. 30, 2001 to Advisory Action mailed Nov. 22, 2006", 10 pgs.
"U.S. Appl. No. 10/643,754, Response filed Jul. 10, 2006 to Non-Final Office Action mailed Feb. 8, 2006", 12 pgs.
"U.S. Appl. No. 10/643,758, Notice of Allowance mailed Jul. 19, 2007", 4 pgs.
"U.S. Appl. No. 10/643,758, Advisory Action mailed May 1, 2007", 3 pgs.
"U.S. Appl. No. 10/643,758, Amendment and Response filed Jul. 10, 2006 to Final Office Action Mar. 10, 2006", 9 pgs.
"U.S. Appl. No. 10/643,758, Final Office Action mailed Feb. 6, 2007", 23 pgs.
"U.S. Appl. No. 10/643,758, Final Office Action mailed Mar. 10, 2006", 13 pgs.
"U.S. Appl. No. 10/643,758, Non-Final Office Action mailed Aug. 15, 2006", 15 pgs.
"U.S. Appl. No. 10/643,758, Non-Final Office Action mailed Aug. 30, 2005", 8 pgs.
"U.S. Appl. No. 10/643,758, Response filed Jan. 30, 2006 to Non-Final Office Action mailed Aug. 30, 2005", 9 pgs.
"U.S. Appl. No. 10/643,758, Response filed Dec. 14, 2006 to Non-Final Office Action mailed Aug. 15, 2006", 17 pgs.
"U.S. Appl. No. 10/643,758, Response filed Apr. 17, 2007 to Final Office Action mailed Feb. 6, 2007", 25 pgs.
"U.S. Appl. No. 10/643,769 Response filed Jul. 23, 2007 non-final office action mailed Apr. 23, 2007", 12 pgs.
"U.S. Appl. No. 10/643,769, Non-Final Office Action mailed Apr. 23, 2007", 13 pgs.
Patterson, D.A., et al., *Computer Architecture A Quantitative Approach*, 2nd Edition, Morgan Kaufmann Publishers, Inc., San Francisco,CA,(1996),255-260 & 308-317.
Patterson, D.A., et al., *Computer Architecture: A Quantitative Approach*, 2nd Edition, Morgan Kaufmann Publishers, San Francisco, CA,(1996),241-243.
Patterson, D. , et al., "Computer Architecture: A Quantitative Approach", Second Edition, Morgan Kaufmann Publishers Inc. ,(1996),251-256.
*The Authoritative Dictionary of IEEE Standards Terms.*, Standards Information Network IEEE Press,(2000),1003.
"U.S. Appl. No. 10/643,574, Notice of Allowance mailed Dec. 5, 2007", NOAR,5 pgs.
"U.S. Appl. No. 10/643,574, Response filed Nov. 7, 2007 to Non-final Office Action mailed Aug. 7, 2007", 15 pgs.
"U.S. Appl. No. 10/643,574, Response filed Jul. 12, 2007 to Advisory Action mailed Mar. 5, 2007", 16 pgs.
"U.S. Appl. No. 10/643,577, Non-Final Office Action mailed Mar. 20, 2006", 13 pgs.
"U.S. Appl. No. 10/643,577, Non-Final Office Action mailed Jul. 27, 2007", OARN,14 pgs.
"U.S. Appl. No. 10/643,577, Response filed Jan. 23, 2008 to Non-Final Office Action mailed Jul. 27, 2007", 18 pgs.
"U.S. Appl. No. 10/643,577, Response filed May 2, 2007 to Final Office Action mailed Nov. 2, 2007", 12 pgs.
"U.S. Appl. No. 10/643,577, Response filed Aug. 21, 2006 to Non-Final Office Action mailed Mar. 20, 2006", 14 pgs.
"U.S. Appl. No. 10/643,586, Response filed Feb. 16, 2007 to Advisory Action mailed Oct. 19, 2006", 18 pgs.
"U.S. Appl. No. 10/643,727, Notice of Allowance mailed Nov. 27, 2007", NOAR,5 pgs.
"U.S. Appl. No. 10/643,738, Non-Final Office Action mailed Nov. 1, 2007", 19 pgs.
"U.S. Appl. No. 10/643,738, Non-Final Office Action mailed Feb. 17, 2006", 9 Pgs.
"U.S. Appl. No. 10/643,741, Amendment and Response mailed Nov. 13, 2007 to Final Office Action mailed Sep. 11, 2007", 14 pgs.
"U.S. Appl. No. 10/643,754, Amendment and Response filed Jan. 25, 2008 to Final Office Action mailed Nov. 25, 2007", 20 pgs.
"U.S. Appl. No. 10/643,754, Final Office Action Mailed Nov. 26, 2007", 29 pgs.
"U.S. Appl. No. 10/643,769, Notice of Allowance mailed Jan. 15, 2008", NOAR,4 pgs.

"U.S. Appl. No. 10/643,769, Notice of Allowance Mailed Oct. 29, 2007", 17 pgs.

"Cray Assembly Language (CAL) for Cray X1tm Systems Reference Manual", *Section 2.6, Memory Ordering*, http://docs.cray.com/books/S-2314-51/index.html,(Jun. 2003),302 pgs.

"International Search Report for International Application No. PCT/IE 95/00047", Date of Completion—Dec. 22, 1995; Authorized Officer—R. Salm.

"International Search Report for International Application No. PCT/US 95/15483", Date of completion—Apr. 24, 1996; Authorized Officer—P. Schenkels.

"Msync—Synchronise Memory with Physical Storage", *The Single UNIXÂ® Specification, Version 2: Msync, The Open Group*, http://www.opengroup.org/onlinepubs/007908799/xsh/mysync.html,(1997)3 pgs.

Abts, D , "So Many States, So Little Time: Verifying Memory Coherence in the Cray X1", *Parallel and Distributed Processing Symposium*, (Apr. 22, 2003),11-20.

Carlile, Bradley R., "Algorithms and Design: the CRAY APP Shared-Memory System", *COMPCON Spring '93. Digest of Papers.*, (Feb. 22, 1993),312-320.

Chen, Y. , et al., "UTLB: A Mechanism for Address Translation on Network Interfaces", *Proceedings of the Eighth International Conference on Architectural Support for Programming Languages and Operating Systems (ASPLOS)*, (1998),193-204.

Ernst, D. , et al., "Cyclone: A Broadcast-Free Dynamic Instruction Scheduler with Selective Replay", *30th Annual International Symposium on Computer Architecture (ISCA-2003)*, (June, 2003) 10 pgs.

Faanes, G. J., et al., "Decoupled Vector Architecture", U.S. Appl. No. 10/643,586, filed Aug. 18, 2003, 47 Pages.

Gail, et al., "Tera Hardware-Software are cooperation", *ACM*, FOAR,(1997),1-16 pgs.

Gharachorloo, Kourosh , "Two Techniques to Enhance the Performance of Memory Consistency Models", *Proceedings of the International Conference on Parallel Processing*, (1991),1-10.

Gupta, Rajiv , et al., "High Speed Synchronization of Processors Using Fuzzy Barriers", *International Journal of Parallel Programming* 19(1), (Feb. 1990), 53-73.

Ishihata, Hiroaki , et al., "Architecture of Highly Parallel AP1000 Computer", *Systems and Computers in Japan*, 24(7), (1993),69-76.

Kontothanassis, L. , et al., "VM-based shared memory on low-latency, remote-memory-access networks", *Proceedings of the ACM ISCA '97*, (1997),157-169.

O'Keefe, Matthew T., et al., "Static Barrier MIMD: Architecture and Performance Analysis", *Journal of Parallel and Distributed Computing*, 25(2), (Mar. 25, 1995),156-132.

Patterson, David A., et al., *Computer Architecture: a Quantitative Approach*, 2nd Edition, Morgan Kaufman Publishers, Inc., San Francisco, CA, (1996),699-708.

Scott, S. , "Synchronization and Communication in the T3E Multiprocessor", *ASPLOS*, vol. II, (1996),pp. 26-36.

Collins, J. D, et al., "Hardware Identification of Cache Conflict Misses", IEEE, 32nd Annual International Symposium on Microarchitecture, (Nov. 18, 1999), 126-135.

*Computer Architecture: A Quantitative Approach*, Morgan Kaufmann Publishers, (2003), 420.

Hennessy, J L, et al., "Computer Architecture A Quantitative Approach", *Morgan Kaufmann*, XP002318184, (Jun. 2002), 390-423.

Hennessy, J. L, et al., "Computer Architecture, A quantative approach", *Morgan Kaufmann*, XP002459576, (Jun. 2002), 528-664 pgs.

US 7,243,211, 07/2007, Kohn (withdrawn)

* cited by examiner

US 7,743,223 B2

DECOUPLING OF WRITE ADDRESS FROM ITS ASSOCIATED WRITE DATA IN A STORE TO A SHARED MEMORY IN A MULTIPROCESSOR SYSTEM

RELATED APPLICATION

This application is related to U.S. patent application Ser. No. 10/643,744, entitled "Multistream Processing System and Method", filed on even date herewith; to U.S. patent application Ser. No. 10/643,577, entitled "System and Method for Processing Memory Transfers", filed on even date herewith; to U.S. patent application Ser. No. 10/643,586, entitled "Decoupled Scalar/Vector Computer Architecture System and Method (as amended)", filed on even date herewith (now U.S. Pat. No. 7,334,110 issued Feb. 19, 2008); to U.S. patent application Ser. No. 10/643,585, entitled "Latency Tolerant Distributed Shared Memory Multiprocessor Computer", filed on even date herewith; to U.S. patent application Ser. No. 10/643,754, entitled "Relaxed Memory Consistency Model", filed on even date herewith; to U.S. patent application Ser. No. 10/643,758 entitled "Remote Translation Mechanism for a Multinode System", filed on even date herewith; and to U.S. patent application Ser. No. 10/643,741, entitled "Multistream Processing Memory-And-Barrier-Synchronization Method and Apparatus", filed on even date herewith (now U.S. Pat. No. 7,437,521, issued Oct. 14, 2008), each of which is incorporated herein by reference.

FIELD OF THE INVENTION

The present invention is related to multiprocessor computers, and more particularly to a system and method for decoupling a write address from write data.

BACKGROUND INFORMATION

As processors run at faster speeds, memory latency on accesses to memory looms as a large problem. Commercially available microprocessors have addressed this problem by decoupling memory access from manipulation of the data used in that memory reference. For instance, it is common to decouple memory references from execution based on those references and to decouple address computation of a memory reference from the memory reference itself. In addition, Scalar processors already decouple their write addresses and data internally. Write addresses are held in a "write buffer" until the data is ready, and in the mean time, read requests are checked against the saved write addresses to ensure ordering.

With the increasing pervasiveness of multiprocessor systems, it would be beneficial to extend the decoupling of write addresses and write data across more than one processor, or across more than one functional unit within a processor. What is needed is a system and method of synchronizing separate write requests and write data across multiple processors or multiple functional units within a microprocessor which maintains memory ordering without collapsing the decoupling of the write address and the write data.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1A:
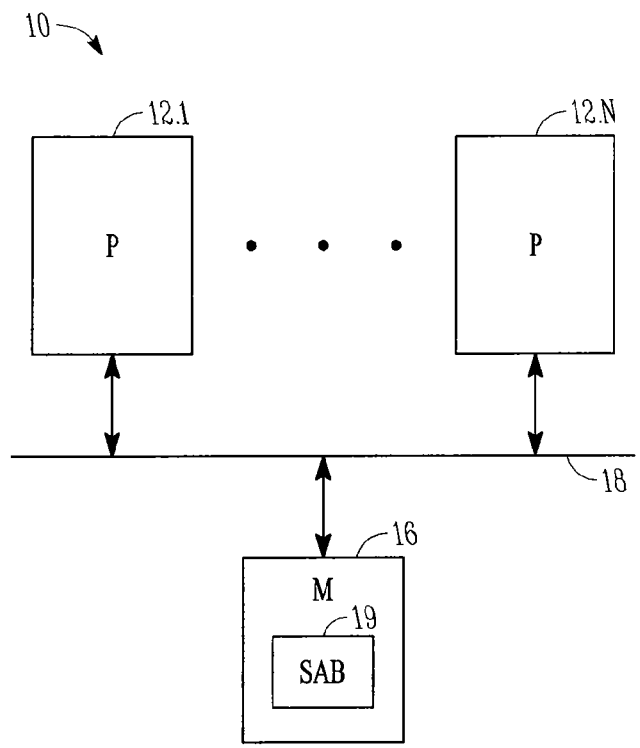
FIG. 1a illustrates a multiprocessor computer system according to the present invention.

A multiprocessor computer system 10 is shown in FIG. 1a. Multiprocessor computer system 10 includes N processors 12 (where N>1) connected by a interconnect network 18 to a shared memory 16. Shared memory 16 includes a store address buffer 19.

Figure 1B:
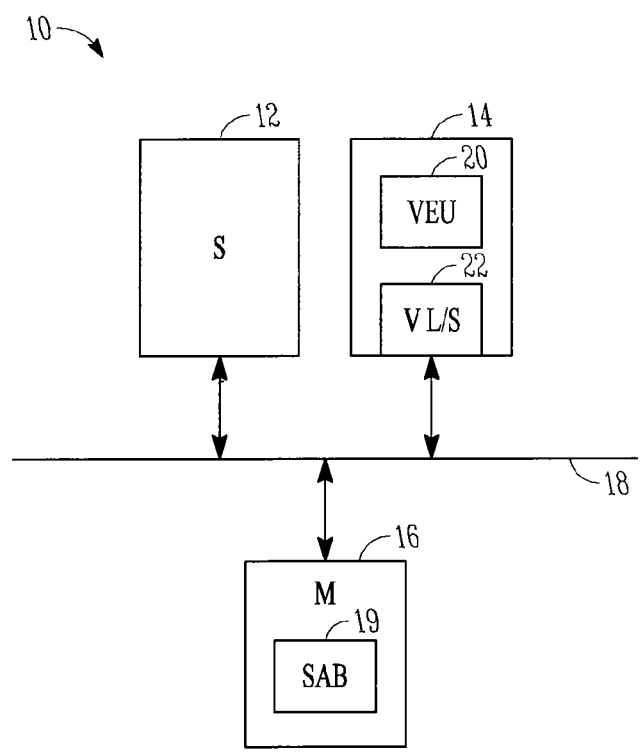
FIG. 1b illustrates another example of a multiprocessor computer system according to the present invention.

Not all processors 12 have to be the same. A multiprocessor computer system 10 having different types of processors connected to a shared memory 16 is shown in FIG. 1b. Multiprocessor computer system 10 includes a scalar processing unit 12, a vector processing unit 14 and a shared memory 16. Shared memory 16 includes a store address buffer 19.

In the example shown, scalar processing unit 12 and vector processing unit 14 are connected to memory 16 across an interconnect network 18. In one embodiment, vector processing unit 14 includes a vector execution unit 20 connected to a vector load/store unit 22. Vector load/store unit 22 handles memory transfers between vector processing unit 14 and memory 16.

The vector and scalar units in vector processing computer 10 are decoupled, meaning that scalar unit 12 can run ahead of vector unit 14, resolving control flow and doing address arithmetic. In addition, in one embodiment, computer 10 includes load buffers. Load buffers allow hardware renaming of load register targets, so that multiple loads to the same architectural register may be in flight simultaneously. By pairing vector/scalar unit decoupling with load buffers, the hardware can dynamically unroll loops and get loads started for multiple iterations. This can be done without using extra architectural registers or instruction cache space (as is done with software unrolling and/or software pipelining). These methods of decoupling are discussed in patent application Ser. No. 10/643,585 entitled "Decoupled Vector Architecture", filed on even date herewith, the description of which is incorporated herein by reference.

In one embodiment, both scalar processing unit 12 and vector processing unit 14 employ memory/execution decoupling. Scalar and vector loads are issued as soon as possible after dispatch. Instructions that depend upon load values are dispatched to queues, where they await the arrival of the load data. Store addresses are computed early (in program order interleaving with the loads), and their addresses saved for later use.

Methods of memory/execution decoupling are discussed as well in patent application Ser. No. 10/643,585, entitled "Decoupled Vector Architecture", filed on even date herewith, the description of which is incorporated herein by reference.

In one embodiment, each scalar processing unit 12 is capable of decoding and dispatching one vector instruction (and accompanying scalar operand) per cycle. Instructions are sent in order to the vector processing units 14, and any necessary scalar operands are sent later after the vector instructions have flowed through the scalar unit's integer or floating point pipeline and read the specified registers. Vector instructions are not sent speculatively; that is, the flow control and any previous trap conditions are resolved before sending the instructions to vector processing unit 14.

The vector processing unit renames loads only (into the load buffers). Vector operations are queued, awaiting operand availability, and issue in order. No vector operation is issued until all previous vector memory operations are known to have completed without trapping (and as stated above, vector instructions are not even dispatched to the vector unit until all previous scalar instructions are past the trap point). Therefore, vector operations can modify architectural state when they execute; they never have to be rolled back, as do the scalar instructions.

In one embodiment, scalar processing unit 12 is designed to allow it to communicate with vector load/store unit 22 and vector execution unit 20 asynchronously. This is accomplished by having scalar operand and vector instruction queues between the scalar and vector units. Scalar and vector instructions are dispatched to certain instruction queues depending on the instruction type. Pure scalar instructions are just dispatched to the scalar queues where they are executed out of order. Vector instructions that require scalar operands are dispatched to both vector and scalar instruction queues. These instructions are executed in the scalar unit. They place scalar operands required for vector execution in the scalar operand queues that are between the scalar and vector units. This allows scalar address calculations that are required for vector execution to complete independently of vector execution.

The vector processing unit is designed to allow vector load/store instructions to execute decoupled from vector execute unit 20. The vector load/store unit 22 issues and executes vector memory references when it has received the instruction and memory operands from scalar processing unit 12. Vector load/store unit 22 executes independently from vector execute unit 20 and uses load buffers in vector execute unit 20 as a staging area for memory load data. Vector execute unit 20 issues vector memory and vector operations from instructions that it receives from scalar processing unit 12.

When vector execution unit 20 issues a memory load instruction, it pulls the load data from the load buffers that were loaded by vector load/store unit 22. This allows vector execution unit 20 to operate without stalls due to having to wait for load data to return from main memory 16.

A method for reducing delays when synchronizing the memory references of multiple processors (such as processors 12 and 14) will be discussed next. The method is useful when a processor is performing writes that, due to default memory ordering rules or an explicit synchronization operation, are supposed to be ordered before subsequent references by another processor.

It is often the case that the address for a write operation is known many clocks (perhaps 100 or more) before the data for the write operation is available. In this case, if another processor's memory references must be ordered after the first processor's writes, then a conventional system may require waiting until the data is produced and the write is performed before allowing the other processor's references to proceed.

Figure 2A:
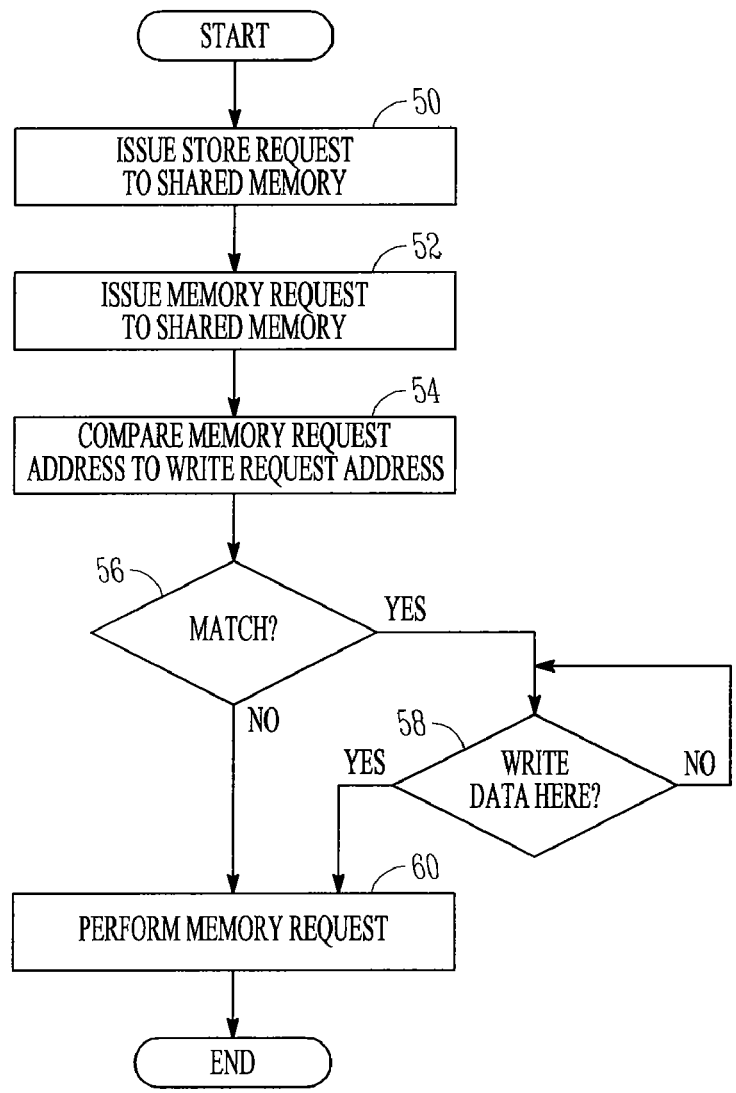
FIG. 2a illustrates a method of decoupling store address and data in a multiprocessor system according to one example embodiment of the present invention.

It is desirable to split the write operations up into two parts—a write address request and a write data request—and send each out to memory system 16 separately. One embodiment of such a method is shown in FIG. 2a. In the embodiment shown in FIG. 2a, write address requests are sent to memory 16 at 50, where they are held in the memory system at 52, either by changing the state of the associated cache lines in a cache, or by saving them in some structure. The purpose of the write address request is to provide ordering of the write request with subsequent requests. Once the write address request has been sent out to the memory system, requests from other processors that are required to be ordered after the write can be sent out to the memory system, even though the data for the write request has not yet been produced.

As the subsequent requests by other processors are processed by the memory system, they are checked at 54 against the stored write addresses. If, at 56, there is no match, then the subsequent requests can be serviced immediately at 60. If, however, there is a match at 56, control moves to 58, where the requests are held in the memory system until the write data arrives, and then serviced.

Not all stores have to be ordered with other memory references. In many cases, the compiler knows that there is no possible data dependence between a particular store reference and subsequent references. And in those cases, the references proceed it just lets the hardware do its own thing and the two references may get re-ordered.

Where, however, the compiler thinks that there may be a dependence, computer system 10 must make sure that a store followed by a load, or a load followed by a store, gets ordered correctly. In one embodiment, each processor 12 and 14 includes an instruction for coordinating references between processors 12 and 14. One such synchronization system is described in patent application Ser. No. 10/643,744, entitled "Multistream Processing System and Method", filed on even date herewith, the description of which is incorporated herein by reference.

In one embodiment, computer system 10 takes the store address and runs it past the other processor's data cache to invalidate any matching entries. This forces the other processor to go to memory 16 on any subsequent reference to that address.

Processor 12 then sends the store addresses out to memory 16 and saves the addresses in memory 12. Then, when another processor 12 (or 14) executes a load that would have hit out of the data cache, it will miss because that line has been invalidated. It goes to memory 16 and gets matched against the stored store addresses. If the reference from the other processor does not match one of the store addresses stored in memory 16, it simply reads its corresponding data from memory. If it does, however, match one of the store addresses stored in memory 16, it waits until the data associated with that store address is written. Memory 16 then reads the data and returns it to the processor that requested it.

The method of the present invention therefore minimizes the delay waiting for the write data in the case there is an actual conflict, and avoids the delay in the case when there is not a conflict.

As an example, consider the case where processor A performs a write X, then processors A and B perform a synchronization operation that guarantees memory ordering, and then processor B performs a read Y. The method of the present invention will cause processor A to send the address for write X out to the memory system as soon as it is known, even though the data for X may not be produced for a considerable time.

Then, after synchronizing, processor B can send its read Y out to the memory system. If X and Y do not match, the memory system can return a value for Y even before the data for X has been produced. The synchronization event, therefore, did not require processor B to wait for processor A's write to complete before performing its read.

If, however, read Y did match the address of write X, then read Y would be stalled in the memory system until the data for write X arrived, at which time read Y could be serviced.

Figure 2B:
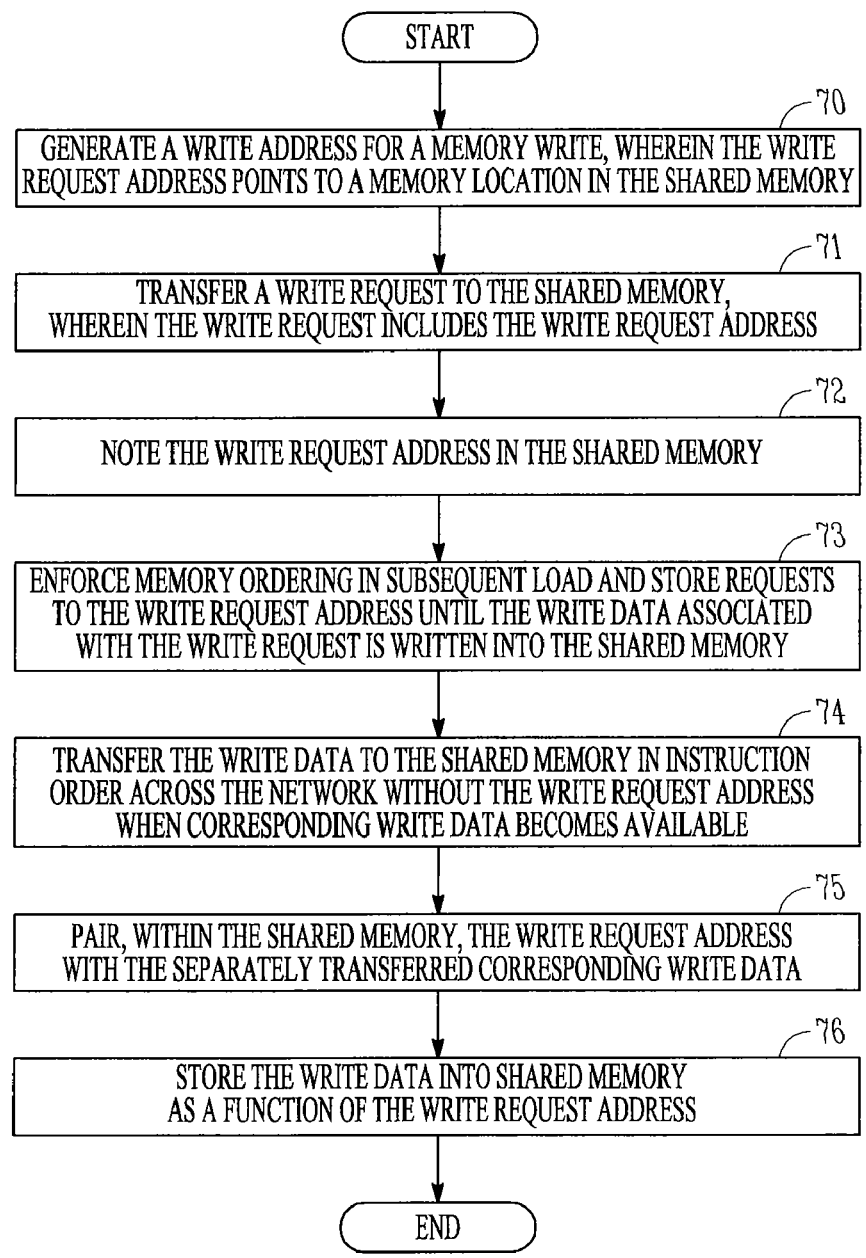
FIG. 2b illustrates a method of decoupling store address and data in a multiprocessor system according to another example embodiment of the present invention.

In one example embodiment, even though the write data and write address are sent at different times, they are received in instruction order at memory 16. In such an embodiment, you don't have to send an identifier associating an address with its associated data. Instead, the association is implied by the ordering. Such an example embodiment is illustrated in FIG. 2b. At 70, a write request address for a memory write is generated in one of a plurality of processors, wherein the write request address points to a memory location in a shared memory coupled to the processors across a network. At 71, a write request is transferred from the processor to the shared memory, wherein the write request includes the write request address. At 72, the write request address is noted in the shared memory. At 73, memory ordering in enforced in subsequent load and store requests to the write request address until the write data associated with the write request is written into the shared memory. At 74, when the corresponding write data becomes available, the corresponding write data is transferred to the shared memory in instruction order across the network without the write request address. At 75, the write request address is paired, within the shared memory, with the separately transferred corresponding write data. Then, at 76, the write data is stored into the shared memory as a function of the write request address.

In one embodiment, memory 16 includes a store address buffer 19 for storing write addresses while the memory waits for the associated write data.

The method according to the present invention requires that the participating processors share a memory system. In one embodiment, the processors share a cache, such as is done in chip-level multiprocessors (e.g., the IBM Power 4). In one such embodiment, store address buffer 19 is located within the cache.

In the embodiment shown in FIG. 1b, vector stores execute in both the vector load/store unit 22 and the vector execute unit 20. As noted above, the store addresses are generated in the vector load/store unit 22 independently of the store data being available. The store addresses are sent to memory 16 without the vector store data. When the store data is generated in vector execute unit 20, the store data is sent to memory 22 where it is paired up with the store address.

The method for reducing delays when synchronizing the memory references of multiple processors can be extended as well to multiple units within a single processor (such as the vector and scalar units of a vector processor).

Figure 3:
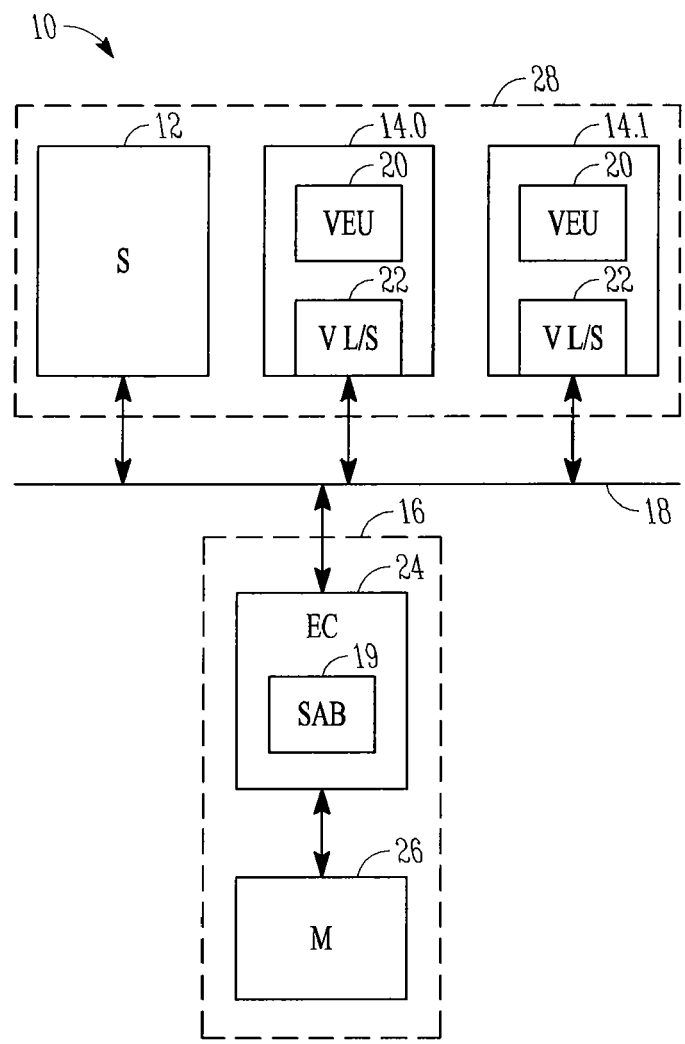
FIG. 3 illustrates a processor having a plurality of processing units connected to a shared memory according to the present invention.

A computer 10 having a processor 28 connected across an interconnect network 18 to a memory 16 is shown in FIG. 3. Processor 28 includes three functional units, all of which share access to memory 16. Vector processing computer 10 in FIG. 3 includes a processor 28. Processor 28 includes a scalar processing unit 12 and two vector processing units (14.0 and 14.1). Scalar processing unit 12 and the two vector processing units 14 are connected to memory 16 across interconnect network 18. In the embodiment shown, memory 16 is configured as cache 24 and distributed global memory 26. Vector processing units 14 include a vector execution unit 20 connected to a vector load/store unit 22. Vector load/store unit 22 handles memory transfers between vector processing unit 14 and memory 16.

In the embodiment shown in FIG. 3, store address buffer 19 is stored in cache 24. In contrast to commercial microprocessors, which store write addresses locally in order to compare them to subsequent accesses to the same memory location, system 10 in FIG. 3 keeps store address buffer 19 in cache 24. This allows synchronization across more than one processor and/or more than one decoupled functional unit executing in a single processor.

Figure 4:
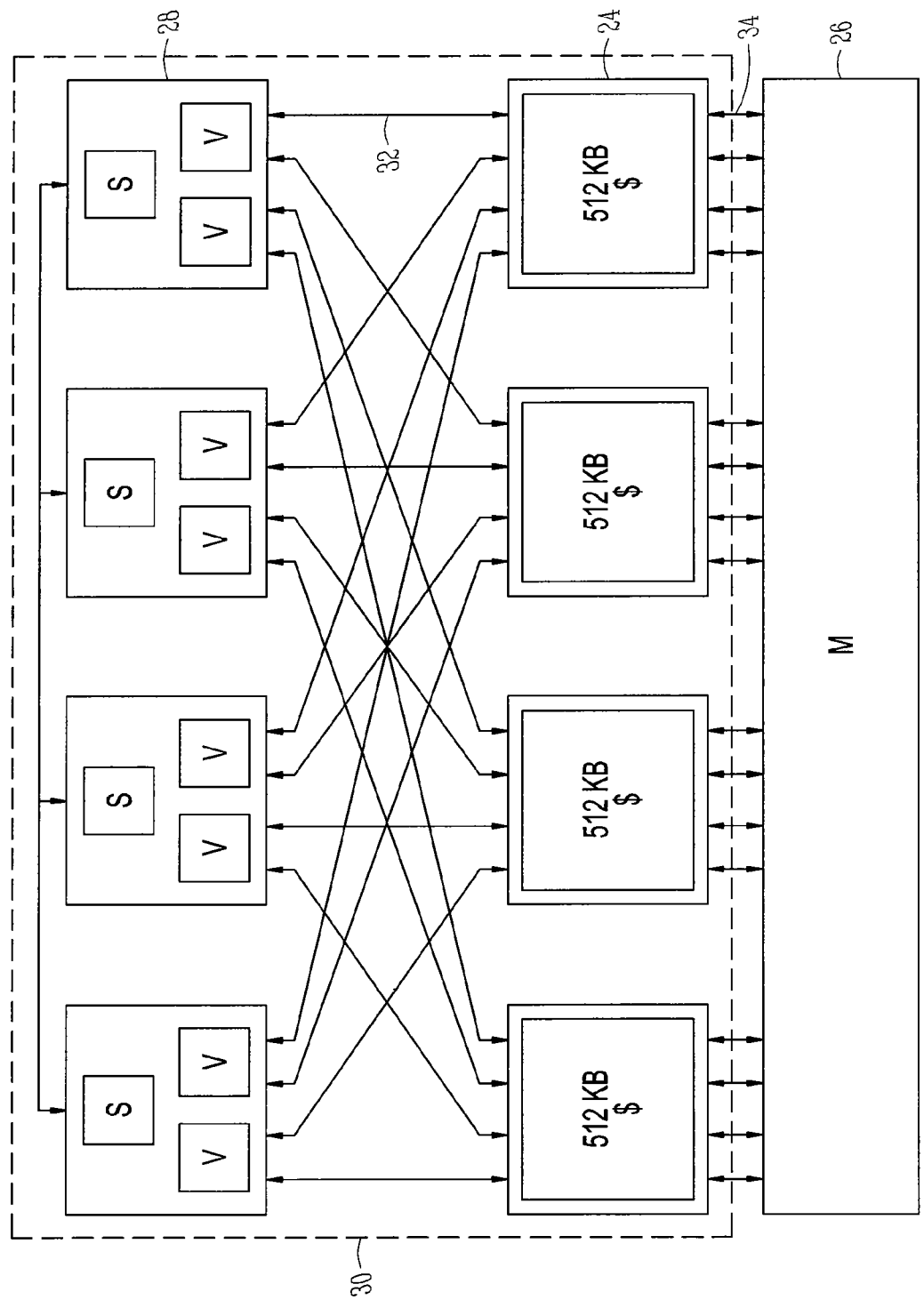
FIG. 4 illustrates a processor node having a plurality of processors connected to a shared memory according to the present invention.

For instance, in one embodiment, four processors 28 and four caches 24 are configured as a Multi-Streaming Processor (MSP) 30. An example of such an embodiment is shown in FIG. 4. In one such embodiment, each scalar processing unit 12 delivers a peak of 0.4 GFLOPS and 0.8 GIPS at the target frequency of 400 MHz. Each processor 28 contains two vector pipes, running at 800 MHz, providing 3.2 GFLOPS for 64-bit operations and 6.4 GFLOPS for 32-bit operations. The MSP 30 thus provides a total of 3.2 GIPS and 12.8/25.6 GFLOPS. Each processor 28 contains a small Dcache used for scalar references only. A 2 MB Ecache 24 is shared by all the processors 28 in MSP 30 and used for both scalar and vector data. In one embodiment processor 28 and cache 24 are packaged as separate chips (termed the "P" chip and "E" chips, respectively).

In one embodiment, signaling between processor 28 and cache 24 runs at 400 Mb/s on processor-cache connection 32. Each processor to cache connection 32 shown in FIG. 4 uses an incoming 64-bit path for load data and an outgoing 64-bit path for requests and store data. Loads can achieve a maximum transfer rate of 51 GB/s from cache 24. Stores can achieve up to 41 GB/s for stride-one and 25 GB/s for non-unit stride stores. In one embodiment, global memory 26 as shown in FIG. 3 is distributed to each MSP 30 as local memory (not shown in FIGS.). In one embodiment, local memory is packaged as a separate chip (termed the "M" chip as shown in FIG. 4. block 26). Each Ecache 24 has four ports 34 to M chip 26 and connected through M chip 26 to local memory In one embodiment, ports 34 are 16 data bits in each direction. MSP 30 has a total of 25.6 GB/s load bandwidth and 12.8-20.5 GB/s store bandwidth (depending upon stride) to local memory.

In the embodiment shown in FIG. 4, the store address buffer could be stored in either cache 24 or shared memory 26. This allows synchronization across more than one processor 28 and/or more than one decoupled functional unit executing in a single processor 28.

In some systems, a load needed to produce store data could potentially be blocked behind a store dependent on that data. In such systems, processors 28 must make sure that loads whose values may be needed to produce store data, cannot become blocked in the memory system behind stores dependent on that data. In one embodiment of system 10, processing units within processor 28 operate decoupled from each other. It is, therefore, possible, for instance, for a scalar load and a vector store to occur out of order. In such cases, the processor must ensure that load request which occur earlier (in program order) are sent out before store address requests that may depend upon the earlier load results. In one embodiment, therefore, issuing a write request includes ensuring that all vector and scalar loads from shared memory for that processor have been sent to shared memory prior to issuing the write request.

In one embodiment, the method according to the present invention is used for vector write operations, and provides ordering between the vector unit 14 and the scalar unit 12 of the same processor 28, as well as between the vector unit of one processor 28 and both the vector and scalar units of other processors 28.

Write addresses could be held by the memory system in several different formats. In one embodiment, a write address being tracked alters the cache state of a cache line in a shared cache within a processor 28. For example, a cache line may be changed to a "WaitForData" state. This indicates that a line contained in the cache is in a transient state in which it is waiting for write data, and is therefore inaccessible for access by other functional units.

In another embodiment, a write address being tracked alters the cache state of cache line in cache 24. For example, a cache line may be changed to a "WaitForData" state. This indicates that a line contained in cache 24 is in a transient state in which it is waiting for write data, and is therefore inaccessible for access by other processors 28.

In another embodiment, write addresses to be tracked are encoded in a structure which does not save their full address. In order to save storage space, the write addresses simply cause bits to be set in a bit vector that is indexed by a subset of the bits in the write address. Subsequent references check for conflicts in this blocked line bit vector using the same subset of address bits, and may suffer from false matches. For example, a write address from one processor to address X may cause a subsequent read from another processor to address Y to block, if X and Y shared some common bits.

In an alternate embodiment of such an approach, a write address being tracked is saved in a structure that holds the entire address for each entry. Subsequent references check which detect a conflict with an entry in the blocked line bit vector, access the structure to obtain the whole write address. In this embodiment, only true matches will be blocked.

This invention can be used with multiple types of synchronization, including locks, barriers, or even default memory ordering rules. Any time a set of memory references on one processor is supposed to be ordered before memory references on another processor, the system can simply ensure that write address requests of the first processor are ordered with respect to the other references, rather than wait for the complete writes, and the write addresses can provide the ordering guarantees via the matching logic in the memory system.

The method according to the present invention reduces latency for multiprocessor synchronization events, by allowing processors to synchronize with other processors before waiting for their pending write requests to complete. They can synchronize with other processors as soon as their previous write request addresses have been sent to the memory system to establish ordering.

DEFINITIONS

In the above discussion, the term "computer" is defined to include any digital or analog data processing unit. Examples include any personal computer, workstation, set top box, mainframe, server, supercomputer, laptop or personal digital assistant capable of embodying the inventions described herein.

Examples of articles comprising computer readable media are floppy disks, hard drives, CD-ROM or DVD media or any other read-write or read-only memory device.

Portions of the above description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. In a computer system having a plurality of processors connected to across a network a shared memory, a method of decoupling a write address from its corresponding write data in a store to the shared memory, comprising:
   generating a write request address for a memory write, wherein the write request address points to a memory location in the shared memory;
   transferring a write request to the shared memory, wherein the write request includes the write request address;
   noting the write request address in the shared memory;
   enforcing memory ordering in subsequent load and store requests to the write request address until the write data associated with the write request is written into the shared memory;
   when the corresponding write data becomes available, transferring the write data to the shared memory in instruction order across the network without the write request address;
   pairing, within the shared memory, the write request address with the separately transferred corresponding write data; and
   storing the write data into the shared memory as a function of the write request address.

2. The method according to claim 1, wherein the shared memory includes a store address buffer and wherein noting the write request address includes writing the address in the store address buffer.

3. The method according to claim 2, further comprising comparing, in the shared memory, addresses in the subsequent load and store requests to the write request address, wherein comparing addresses in the subsequent load and store requests includes stalling the subsequent load requests to the write request address until the write data is written into the shared memory if there is a match.

4. The method according to claim 1, further comprising comparing, in the shared memory, addresses in the subsequent load and store request to the write request address, wherein the shared memory includes a cache, wherein noting the write request address includes changing a state in a cache line associated with the write request address to "WaitFor- Data", and wherein comparing addresses in subsequent load and store requests to the write request address includes accessing the cache and stalling if a cache line hit returns a "WaitForData" state.

5. The method according to claim 1, further comprising comparing, in the shared memory, addresses in the subsequent load and store request to the write request address, wherein the shared memory includes a bit vector, wherein noting the write request address in the shared memory includes setting one or more bits in the bit vector corresponding to the write request address, and wherein comparing addresses in subsequent load and store requests to the write request address includes comparing bits that would be set corresponding to the load and store request addresses with the bits set for the write request address and stalling servicing of the load and store requests if there is a match.

6. The method according to claim 1, further comprising comparing, in the shared memory, addresses in the subsequent load and store request to the write request address, wherein comparing addresses in the subsequent load and store requests includes stalling the subsequent load requests to the write request address until the write data is written into the shared memory if there is a match.

7. The method according to claim 6, wherein comparing addresses in the subsequent load and store requests includes servicing the load and store requests to addresses other than the write request address without waiting for the write data to be written to the write request address if there is no match.

8. The method according to claim 1, further comprising comparing, in the shared memory, addresses in the subsequent load and store request to the write request address, wherein comparing addresses in the subsequent load and store requests includes servicing the load and store requests to addresses other than the write request address without waiting for the write data to be written to the write request address if there is no match.

9. The method according to claim 1, wherein transferring a write request includes ensuring that all vector and scalar loads from shared memory for that processor have been sent to the shared memory prior to issuing the write request.

10. A computer system, comprising:
a plurality of processors, wherein the processors includes means for issuing a write address separate from data to be written to the write address; and
a shared memory connected by a network to the plurality of processors, wherein the shared memory includes:
means for receiving a first write request including a first write address;
means for noting the write request address to the shared memory;
means for stalling subsequent load and store requests to a memory location in the shared memory associated with the first write address until the data associated with the first write request is received and written by the shared memory;
means for receiving write data in instruction order across the network without the write request address; and
means for pairing the write request address with the separately transferred corresponding write data prior to storing the write data to the shared memory as a function of the write request address;
wherein the processors enforce memory ordering in the subsequent load and store requests to the write request address until the write data associated with the first write request is written into the shared memory.

11. In a computer system having a plurality of processors connected to a shared memory, a method of decoupling a write address from its corresponding write data in a write to the shared memory, comprising:
generating a write request address for a memory write, wherein the write request address points to a memory location in shared memory;
issuing a first write request to the shared memory, wherein the first write request includes the write request address;
noting the write request address in the shared memory;
comparing, in the shared memory, addresses in subsequent read and write requests to the write request address;
stalling the subsequent read requests to the write request address until the write data corresponding to the first write request is written into the shared memory; and
if the address in a subsequent write request matches the write request address stored in the shared memory and there are no stalled read requests to the write request address, discarding the first write request.

12. The method according to claim 11, wherein the shared memory includes a store address buffer and wherein noting the write request address includes writing the address in the store address buffer.

13. The method according to claim 12, wherein comparing addresses in subsequent read and write requests includes stalling subsequent read requests to the write request address until the write data is written into the shared memory.

14. The method according to claim 11, wherein the shared memory includes a cache, wherein noting the write request address includes changing a state in a cache line associated with the write request address to "WaitForData", and wherein comparing addresses in subsequent read and write requests to the write request address includes accessing the cache and stalling if a cache line hit returns a "WaitForData" state.

15. The method according to claim 11, wherein the shared memory includes a bit vector, wherein noting the write request address in the shared memory includes setting one or more bits in the bit vector corresponding to the write request address, and wherein comparing addresses in subsequent read and write requests to the write request address includes comparing bits that would be set corresponding to the load and store request addresses the bits set for the write request address and stalling servicing of the load and store requests if there is a match.

16. The method according to claim 11, wherein comparing addresses in subsequent read and write requests includes stalling the subsequent read requests to the write request address until the write data is written into the shared memory.

17. The method according to claim 16, wherein comparing addresses in subsequent read and write requests includes servicing the read and write requests to addresses other than the write request address without waiting for the write data to be written to the write request address.

18. The method according to claim 11, wherein comparing addresses in subsequent read and write requests includes servicing the read and write requests to addresses other than the write request address without waiting for the write data to be written to the write request address.

19. The method according to claim 11, wherein comparing addresses in subsequent read and write requests includes enforcing memory ordering in the subsequent read and write requests to the write request address until the write data associated with the first write request is written into the shared memory.

20. The method according to claim 11, wherein issuing a write request includes ensuring that all vector and scalar loads from shared memory for that processor have been sent to the shared memory prior to issuing the write request.

21. In a computer system having a plurality of processors connected across a network to a shared memory, a method of decoupling a write address from its corresponding write data in a store to the shared memory, comprising:
- generating a write request address for a vector store to memory, wherein the write request address points to a memory location in the shared memory;
- transferring a vector store request to the shared memory, wherein the write request includes the write request address;
- noting the write request address to the shared memory;
- enforcing memory ordering in subsequent load and store requests to the write request address until the write data associated with the write request is written into the shared memory;
- when the corresponding write data becomes available, transferring the write data from a vector register to the shared memory in instruction order across the network without the write request address;
- pairing, within the shared memory, the write request address with the separately transferred corresponding write data; and
- storing the write data into the shared memory as a function of the write request address.

22. The method according to claim 21, wherein the shared memory includes a store address buffer and wherein noting the write request address includes writing the address in the store address buffer.

23. The method according to claim 22, further comprising comparing, in the shared memory, addresses in the subsequent load and store requests to the write request address, wherein comparing addresses in the subsequent load and store requests includes stalling the subsequent load requests to the write request address until the write data is written into the shared memory if there is a match.

24. The method according to claim 21, further comprising comparing, in the shared memory, addresses in the subsquent load and store requests to the write request address, wherein the shared memory includes a cache, wherein noting the write request address includes changing a state in a cache line associated with the write request address to "WaitForData", and wherein comparing addresses in the subsequent load and store requests to the write request address includes accessing the cache and stalling if a cache line hit returns a "WaitForData" state.

25. The method according to claim 21, further comprising comparing, in the shared memory, addresses in the subsequent load and store requests to the write request address, wherein the shared memory includes a bit vector, wherein noting the write request address in the shared memory includes setting one or more bits in the bit vector corresponding to the write request address, and wherein comparing addresses in the subsequent load and store requests to the write request address includes comparing bits that would be set corresponding to the load and store request addresses with the bits set for the write request address and stalling servicing of the load and store requests if there is a match.

26. The method according to claim 21, further comprising comparing, in the shared memory, addresses in the subsequent load and store requests to the write request address, wherein comparing addresses in the subsequent load and store requests includes stalling the subsequent load requests to the write request address until the write data is written into the shared memory if there is a match.

27. The method according to claim 26, wherein comparing addresses in the subsequent load and store requests includes servicing the load and store requests to addresses other than the write request address without waiting for the write data to be written to the write request address if there is no match.

28. The method according to claim 21, further comprising comparing, in the shared memory, addresses in the subsequent load and store requests to the write request address, wherein comparing addresses in the subsequent load and store requests includes servicing the load and store requests to addresses other than the write request address without waiting for the write data to be written to the write request address if there is no match.

29. The method according to claim 21, wherein transferring a write request includes ensuring that all vector and scalar loads from shared memory for that processor have been sent to the shared memory prior to issuing the write request.

30. A method of decoupling vector data stores from vector instruction execution, comprising:
- executing a vector instruction on vector data stored in a vector register, wherein executing a vector instruction includes storing result vector data in the vector register;
- generating a vector write address for a vector store;
- transferring a vector store request across a network to memory, wherein the vector store request includes the vector write address;
- noting the vector write address in the memory;
- enforcing memory ordering in subsequent read and write requests to the vector write address until the result vector data associated with the vector store request is written into the memory;
- when the corresponding write data becomes available, transferring the result vector data from the vector register to the memory in instruction order across the network without the vector write address;
- pairing, within the memory, the vector write address with the separately transferred corresponding result vector data; and
- storing the result vector data into the memory as a function of the vector write address in the vector store request.

31. The method according to claim 30, further comprising comparing, in the memory, addresses in the subsequent read and write requests to the vector write request address, wherein comparing addresses in the subsequent read and write requests to the vector write address includes stalling the subsequent read requests to the vector write address until the result vector data is written into the memory. request is received and written by the shared memory.

32. In a processor having a plurality of processing units connected across a network to a shared memory, a method of decoupling a write address from its corresponding write data in a write to the shared memory, comprising:
- generating a write request address for a memory write, wherein the write request address points to a memory location in the shared memory;
- transferring a write request to the shared memory, wherein the write request includes the write request address;
- storing the write request address in the shared memory;
- enforcing memory ordering in the subsequent read and write requests to the write request address until the write data associated with the request is written into the shared memory;
- when the corresponding write data becomes available, transferring the write data to the shared memory in instruction order across the network without the write request address;
- pairing, within the shared memory, the write request address with the separately transferred corresponding write data; and storing the corresponding write data into the shared memory as a function of the write request address.

33. The method according to claim 32, wherein transferring a write request includes ensuring that all vector and scalar loads from shared memory for that processor have been sent to the shared memory prior to issuing the write request.

34. The method according to claim 32, further comprising comparing, in the shared memory, addresses in the subsequent read and write requests to the write request address, wherein comparing addresses in the subsequent read and write requests includes stalling the subsequent read requests to the write request address until the write data is written into the shared memory if there is a match.

35. The method according to claim 34, wherein comparing addresses in the subsequent read and write requests includes servicing the read and write requests to addresses other than the write request address without waiting for the write data to be written to the request address if there is no match.

* * * * *

UNITED STATES PATENT AND TRADEMARK OFFICE
CERTIFICATE OF CORRECTION

PATENT NO. : 7,743,223 B2  
APPLICATION NO. : 10/643742  
DATED : June 22, 2010  
INVENTOR(S) : Steven L. Scott et al.

Page 1 of 2

It is certified that error appears in the above-identified patent and that said Letters Patent is hereby corrected as shown below:

On the title page, item (56), under "Other Publications", in column 2, line 1, delete "Tthe" and insert -- The --, therefor.

In column 2, line 52, delete "10/643,585" and insert -- 10/643,586 --, therefor.

In column 2, line 52, delete ""Decoupled Vector Architecture"," and insert -- "Decoupled Scalar/Vector Computer Architecture System and Method", --, therefor.

In column 2, line 64, delete "10/643,585," and insert -- 10/643,586, --, therefor.

In column 2, line 65, delete ""Decoupled Vector Architecture"," and insert -- "Decoupled Scalar/Vector Computer Architecture System and Method", --, therefor.

In column 5, line 20, delete "in" and insert -- is --, therefor.

In column 6, lines 29-38, delete "In one embodiment, global memory 26 as shown in FIG. 3 is distributed to each MSP 30 as local memory (not shown in FIGS.). In one embodiment, local memory is packaged as a separate chip (termed the "M" chip as shown in FIG. 4. block 26). Each Ecache 24 has four ports 34 to M chip 26 and connected through M chip 26 to local memory. In one embodiment, ports 34 are 16 data bits in each direction. MSP 30 has a total of 25.6 GB/s load bandwidth and 12.8-20.5 GB/s store bandwidth (depending upon stride) to local memory." and insert -- In one embodiment, global memory 26 as shown in FIG. 3 is distributed to each MSP 30 as local memory (not shown in FIGS.). In one embodiment, local memory is packaged as a separate chip (termed the "M" chip as shown in FIG. 4. block 26). Each Ecache 24 has four ports 34 to M chip 26 and connected through M chip 26 to local memory. In one embodiment, ports 34 are 16 data bits in each direction. MSP 30 has a total of 25.6 GB/s load bandwidth and 12.8-20.5 GB/s store bandwidth (depending upon stride) to local memory. --, below "stores." as a new paragraph.

In column 8, line 29, in Claim 1, delete "connected to" and insert -- connected --, therefor.

In column 8, line 29, in Claim 1, after "network" insert -- to --.

Signed and Sealed this

Seventh Day of September, 2010

David J. Kappos  
*Director of the United States Patent and Trademark Office*

CERTIFICATE OF CORRECTION (continued)
U.S. Pat. No. 7,743,223 B2

In column 8, line 64, in Claim 4, delete "request" and insert -- requests --, therefor.

In column 9, line 1, in Claim 4, delete "in" and insert -- in the --, therefor.

In column 9, line 7, in Claim 5, delete "request" and insert -- requests --, therefor.

In column 9, line 12, in Claim 5, delete "in" and insert -- in the --, therefor.

In column 9, line 19, in Claim 6, delete "request" and insert -- requests --, therefor.

In column 9, line 31, in Claim 8, delete "request" and insert -- requests --, therefor.

In column 9, line 49, in Claim 10, after "the" insert -- first --.

In column 11, line 37, in Claim 24, delete "subsquent" and insert -- subsequent --, therefor.

In column 12, lines 45-46, in Claim 31, after "memory." delete "request is received and written by the shared memory."

In column 12, line 59, in Claim 32, after "the" insert -- write --.

In column 14, line 8, in Claim 35, after "the" insert -- write --.